June 30, 1970  R. L. PROPST ET AL  3,517,467
STRUCTURAL SUPPORT SYSTEM FOR SHELVING
Filed June 17, 1968  6 Sheets-Sheet 4

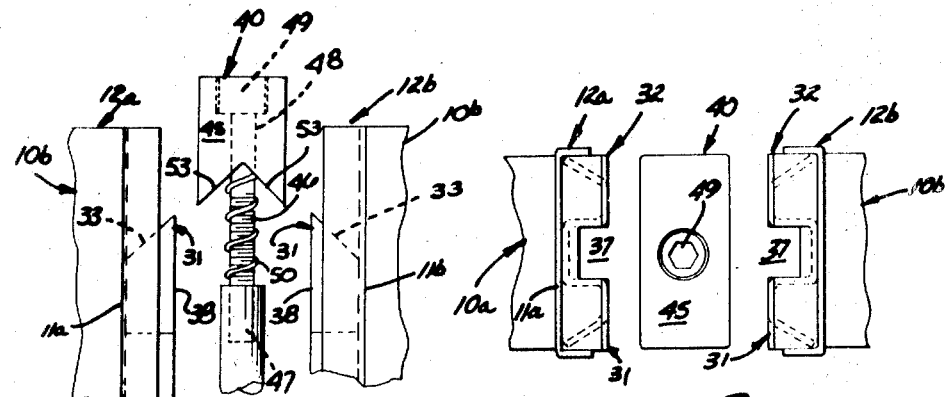

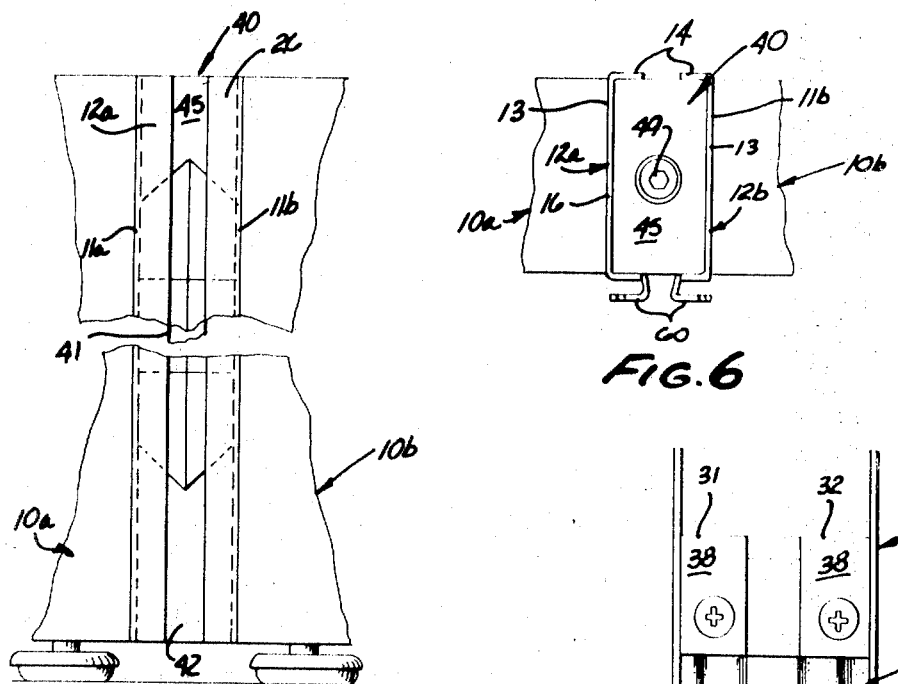
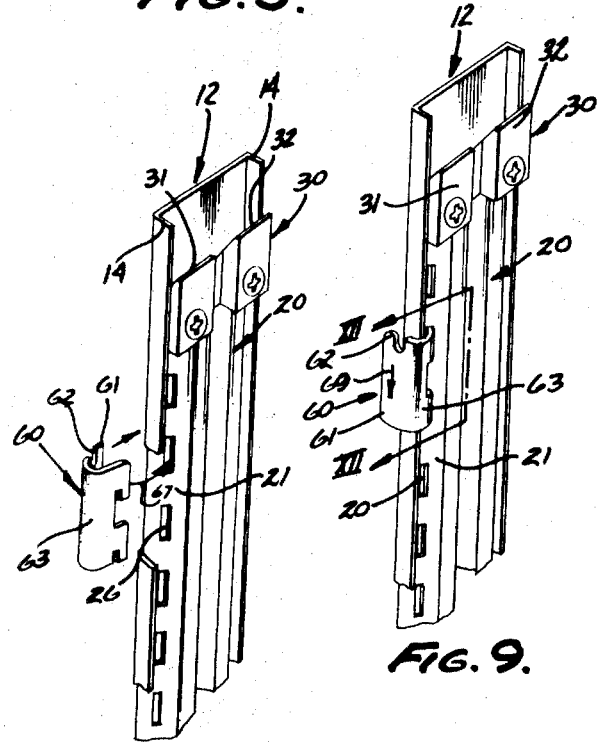
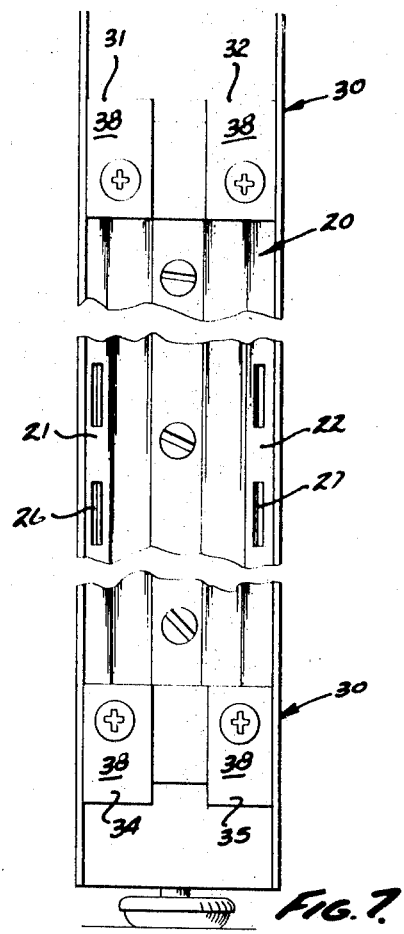

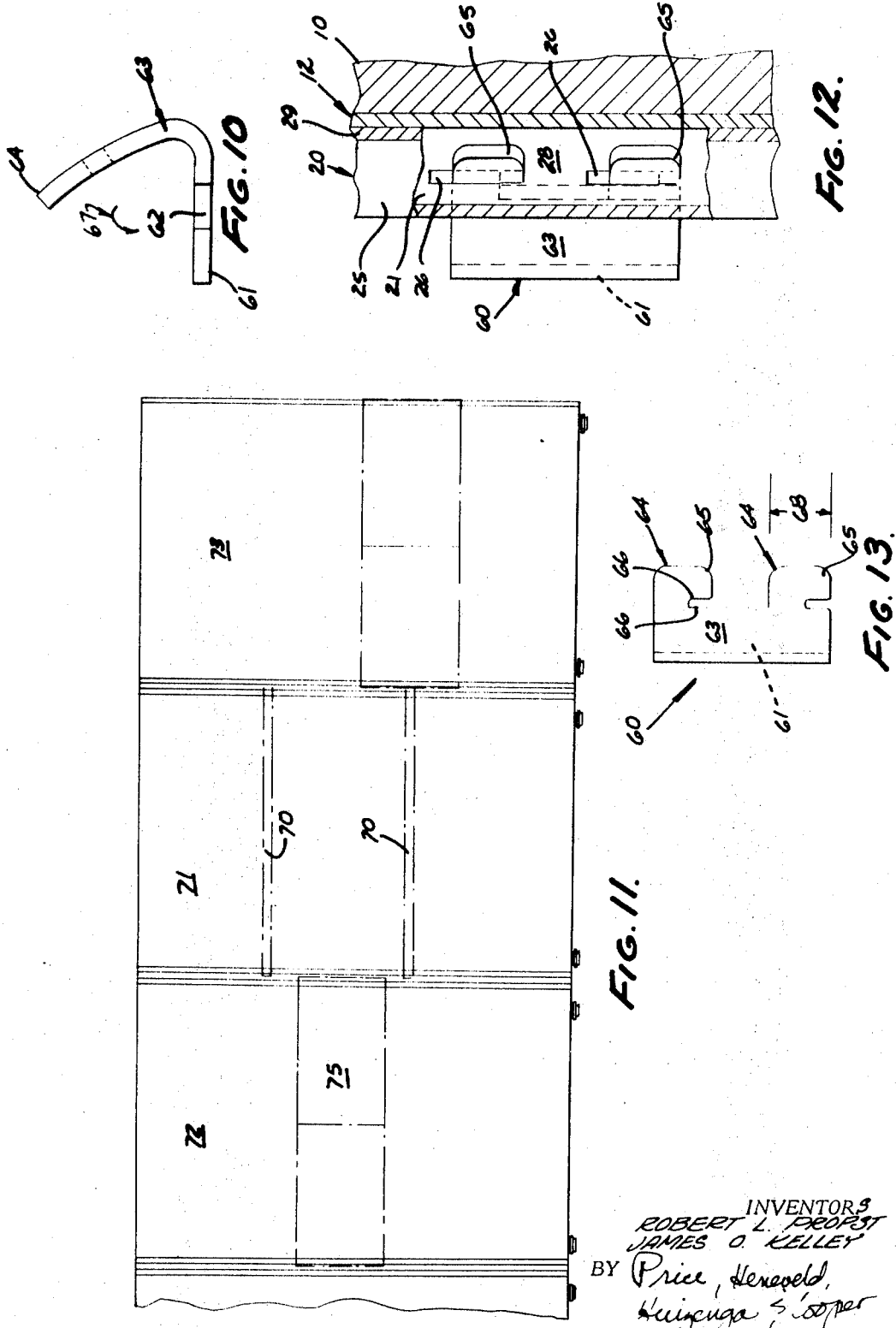

INVENTORS
ROBERT L. PROPST
JAMES O. KELLEY
BY *Price, Heneveld,*
*Huizenga & Cooper*
ATTORNEYS

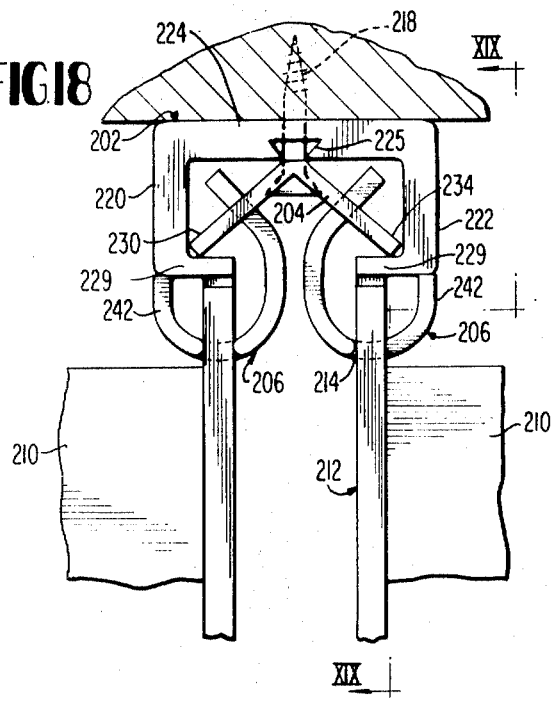
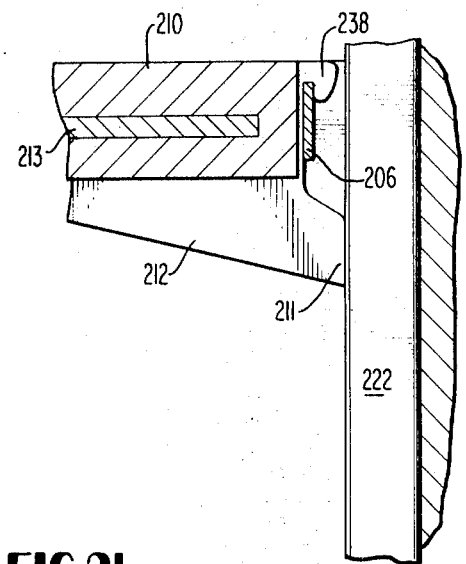
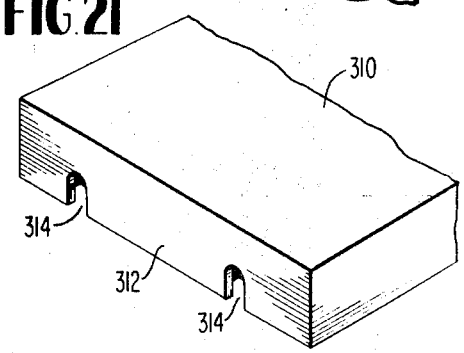
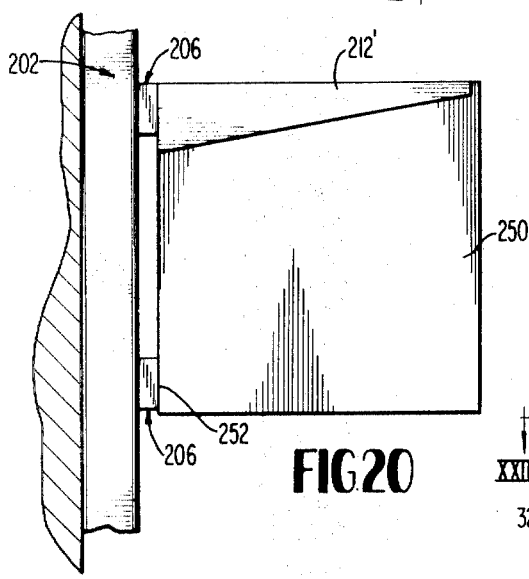
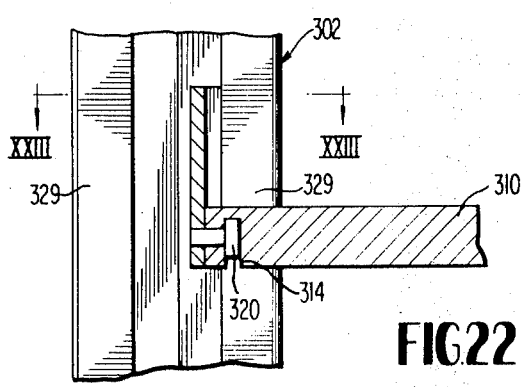
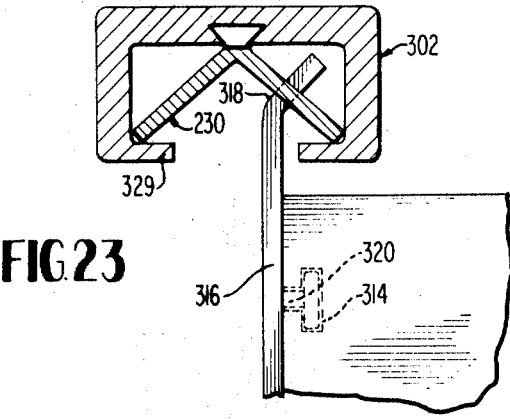
INVENTORS
ROBERT L. PROPST
JAMES O. KELLEY

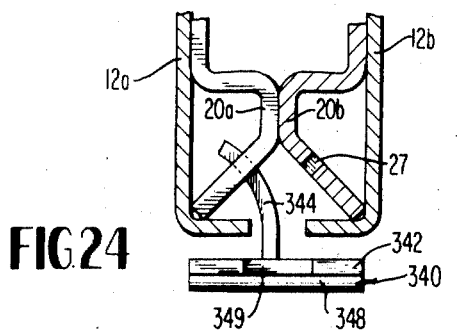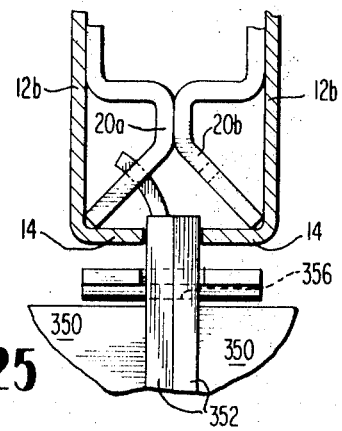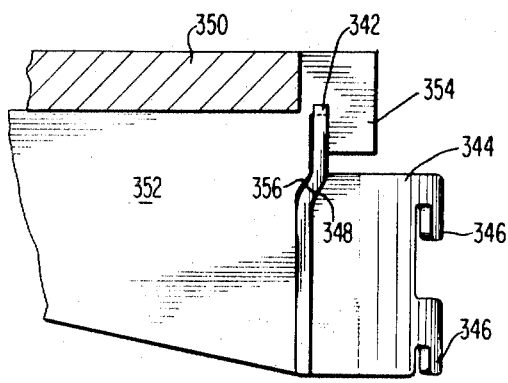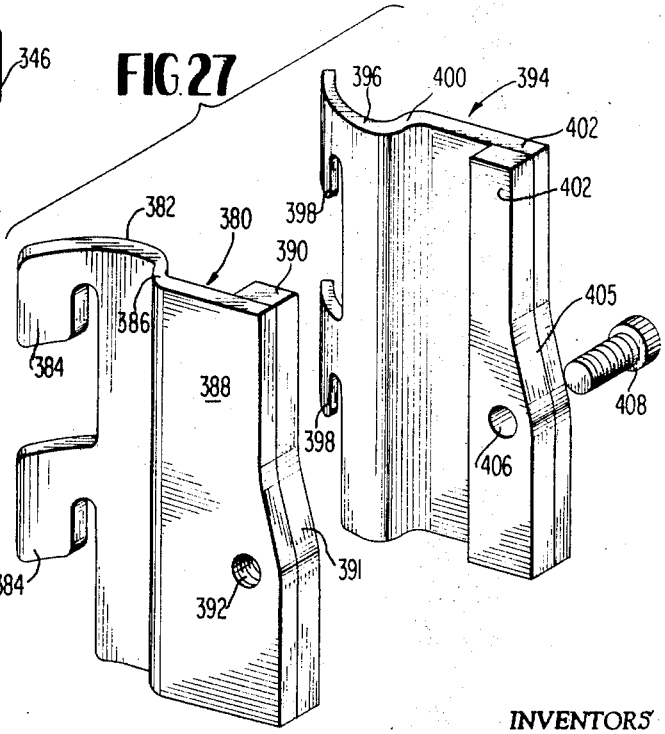
INVENTORS
ROBERT L. PROPST
JAMES O. KELLEY

United States Patent Office 3,517,467
Patented June 30, 1970

3,517,467
STRUCTURAL SUPPORT SYSTEM FOR SHELVING
Robert L. Propst, Ann Arbor, and James O. Kelley, Saline, Mich., assignors to Herman Miller, Inc., Zeeland, Mich., a corporation of Michigan
Continuation-in-part of application Ser. No. 623,878, Mar. 17, 1967. This application June 17, 1968, Ser. No. 737,522
Int. Cl. A47f 5/08, 5/16
U.S. Cl. 52—36    32 Claims

ABSTRACT OF THE DISCLOSURE

A structural support system for space divider hung furniture components in which support system hanger strips, enclosed within a vertical support member, are provided with pairs of juxtaposed slots which support clips in adjacent relationship to thereby permit independent furniture units to be supported by each support member at a common level. The hanger strips are shaped such that the slots are at least partially concealed behind inwardly directed flanges at the face of the support member.

---

Each of the panel edges is provided, additionally, with a channular recess wherein there is positioned an elongated hanger frame. The hanger frame comprises a pair of elongated box-like beams, each having a surface extending from the interior base of the flange and forming an open area between the base of the recess and the surface. Each of the surfaces is provided with a plurality of vertically aligned slots and a hanger clip, having a curved shank with at least two hook portions thereon, is adapted to be inserted into the slot by rotating the shank portion about vertical axes to clear the adjacent flange until the hook portions pass into the open areas. The hanger clip is then dropped downwardly for positive engagement with the hanger frame. In this manner, an accessory article may be supported from each edge of a single panel independently of the panel joint and, thus, the accessory article need not be removed when the panel joints are unlocked for rearrangement of the system.

In a modified form, the system comprises a wall supported longitudinally extending vertical channel, a vertically disposed hanger member within the channel having a plurality of vertically disposed slots and accessory supporting clips in at least some of the slots. The channel and hanger member are so shaped as to restrain relative lateral movement between the hanger and the channel and to provide a receiving area for hanger-engaging portions of the clips.

The channel, hanger member and clips are so shaped as to restrain lateral movement of the clips relative to the hanger member and the channel when the clips are positioned in the hanger slots.

This application is a continuation-in-part of our copending application entitled Panel Joint, Ser. No. 623,878, filed Mar. 17, 1967, now U.S. Pat. 3,430,997.

This invention relates to structural supports. In one of its aspects it relates to a structural support system comprising a vertical channel member and a vertically disposed hanger member within the channel member wherein the hanger member is longitudinally slidable within the channel member but otherwise restrained by the channel, and wherein the hanger member contains a plurality of longitudinally disposed slots.

In another of its aspects, the invention relates to a structural support system in which there is provided a longitudinal casing having a pair of longitudinal side members and a pair of inwardly directed flanges at at least one end of each side, forming a vertical slot, and a hanger member disposed within the longitudinal casing, the hanger member containing a plurality of vertically disposed slots.

In another of its aspects, the invention relates to a structural support system as has been hereinbefore described wherein accessory supporting clip members are positioned in at least some of the hanger slots and the clips extend out of the channel, and wherein the clips have accessory supporting portions thereon.

In another of its aspects the invention relates to a structural support system as has been hereinbefore described wherein the channel and hanger members are so shaped as to provide lateral restraining surfaces for the clips when the same are positioned in this hanger slot.

Many systems have been proposed for hanging shelves and other furniture units from the walls. Some of the more popular systems employ a rail which is attached to the wall. Slots are provided in the rails to engage hooks on the shelves for support. In order to independently support two shelves, for example, at the same level, it is necessary to provide two rows of slots for engaging each shelf or other accessory supporting unit.

From an aesthetic standpoint, it is desirable to hide the slots from view. It is known to position the slots within the casing having a longitudinal opening when a single row of slots are used. It becomes difficult to hide the slots when there are two rows of slots since the opening must be widened when using conventional attaching means.

We have now discovered a support system whereby adjacent furniture accessories can be independently supported at any supporting member wherein the slots can be hidden from obvious view when the slots are contained in hanger members in a casing. Preferably the hanger members are angularly disposed relative to the sides and front of the casing, and angled slot engaging accessory supports can be employed to support the accessories.

By various aspects of this invention one or more of the following, or other, objects can be obtained:

It is an object of this invention to provide an improved vertical support system for hanging accessories.

It is another object of this invention to provide a wall supported system for hanging modular units and the like wherein the attachment means are not visible from the front of the system.

It is a still further object of this invention to provide a simple wall supported system for modular units wherein attaching clips are employed, which clips are laterally constrained by the system.

It is yet another object of this invention to provide a space divider system embodying a unique wall-hung accessory mounting system wherein the retaining characteristics of the anchoring member are not dependent upon the abutment of two separate panels or other components for existence.

Thus, it is an object of this invention to provide a system of the type described wherein any particular wall-hung accessory can be supported from a single panel independently of its interconnection with adjacent panels and, thus, wherein the necessity for removing such accessories prior to rearranging the space-division configuration is obviated.

It is an object of this invention to provide a system of the type described wherein two vertically oriented accessory anchoring members are positioned on either side of the divider components at each component joint and, thus, wherein accessories can be independently supported at and extend either direction from a given component joint.

It is also an object of this invention to provide an accessory mounting system of the type described embodying a novel retaining clip which permits the clip-retaining apertures in each of the panels to be concealed, thus affording a pleasant over-all appearance to the installation.

Other aspects, objects, and the several advantages of this invention are apparent to one skilled in the art from a study of this disclosure, the drawings, and the appended claims.

According to the invention there is provided a structural support system comprising a longitudinal casing member having disposed therein a longitudinal hanger means. The casing has a pair of spaced walls and inwardly directed flanges at at least one edge of the spaced walls, forming a longitudinal opening in the casing. The hanger means has a plurality of longitudinally disposed slots which are preferably positioned behind the inwardly directed flanges. The hanger means is so positioned within the casing that access of supporting clips can be inserted into the slots in adjacent relationship for independently supporting abutting accessories.

In one embodiment, the support system is part of a joint structure in a space divider arrangement from which joint structure, accessories can be hung from either side of the space dividers.

In another embodiment, the structural support system is attached to a fixed wall or post. This structural support system comprises a vertical channel member, a longitudinal hanger member slidable longitudinally in the channel but otherwise constrained by the channel, and at least one accessory supporting clip which is adapted to be positioned in clip receiving slots in the hanger members. The hanger members and the channel are so shaped as to provide lateral restraining surfaces for the clips when the same are positioned in the slots. The channel and the hanger member are also so shaped as to provide receiving slots for the hanger engaging portions of the clips.

The invention will now be described with reference to the accompanying drawings in which:

FIG. 1 is a broken, fragmentary, front-elevational view showing a pair of wall panels prior to their being pushed into abutment with one another;

FIG. 2 is a fragmentary, plan view of the panels in the position shown in FIG. 1;

FIG. 3 is a fragmentary, broken, front-elevational view of a pair of abutting panels which have not yet been interlocked but have been slid into abutment;

FIG. 4 is a cross-sectional view taken along plane IV—IV of FIG. 3;

FIG. 5 is broken, fragmentary, front-elevational view of the panels shown in FIG. 3 with the draw blocks converged to interlock the panel;

FIG. 6 is a fragmentary plan view of the structure illustrated in FIG. 5;

FIG. 7 is a broken, end-elevational view of a typical panel and the joint components affixed thereto;

FIG. 8 is an exploded, fragmentary perspective view of the hanger frame and hanger clip;

FIG. 9 is a fragmentary perspective view of the hanger frame showing the clip placed in load supporting position thereon;

FIG. 10 is a plan view of the hanger clip;

FIG. 11 is a fragmentary, front-elevational view of a series of four jointed panels illustrating in phantom a series of bookcases, bookshelves or other wall-supported items of furniture supported thereon;

FIG. 12 is a fragmentary, cross-sectional view taken along plane XII—XII of FIG. 9;

FIG. 13 is a side-elevational view of the hanger clip;

FIG. 18 is a plan view similar to FIG. 14 showing a third embodiment of the invention;

FIG. 19 is a side view of the third embodiment, taken along lines XIX—XIX of FIG. 18;

FIG. 20 is a side view of a cabinet supported by the novel support system illustrating a fourth embodiment of the invention;

FIG. 21 is a perspective view of a shelf unit employed in a fifth embodiment of the invention;

FIG. 22 is a front elevational view, partly in section, illustrating the fifth embodiment of the invention;

FIG. 23 is a plan view, partly in section, taken along lines XXIII—XXIII of FIG. 22;

FIG. 24 is a plan view, partly in section, of a sixth embodiment of the invention;

FIG. 25 is a plan view of the sixth embodiment of the invention showing how shelf units are attached thereto;

FIG. 26 is a side elevational view of the clip and a shelf unit shown in FIG. 25;

FIG. 27 is a perspective exploded view of a seventh embodiment of the invention; and FIG. 28 is a plan view, partly in section, of the seventh embodiment of the invention showing the attachment of shelf units and the like.

Figure 14:
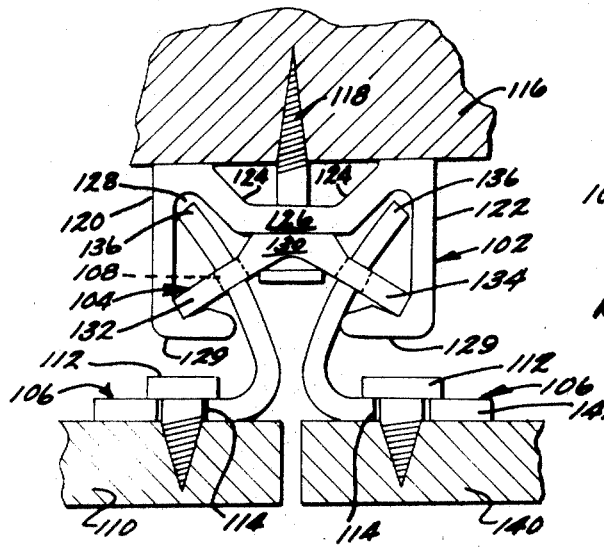
FIG. 14 is a plan view, partly in section, showing a second embodiment of the invention as employed in supporting a pair of vertically disposed clip boards.

Referring now to the FIGS. 1 through 13, a first embodiment of this invention will be described in detail. In FIGS. 1 through 7 there is illustrated a pair of space divider panels 10a and 10b having edges 11a and 11b, respectively. Each of the edges 11a and 11b have a channel-like member, 12a and 12b respectively, affixed thereto by conventional means such as screws or the like. Each of the channel-like members 12 has a base 13 and upstanding flanges 14 (see FIG. 4) to form a channnular recess along the entire vertical length of each of the panel edges.

Referring additionally to FIGS. 7 through 9, the panel interlock assembly, indicated generally by the reference numeral 30, comprises an upper forward wedge block 31, an upper rear wedge block 32, a lower forward wedge block 34 and a lower rear wedge block 35 affixed to the sides of each of the panels 10a and 10b within the channnular recesses 12 as indicated in the figures. The upper wedge blocks 31 and 32 have upwardly inclined wedging surfaces 33 and the lower wedge members 34 and 35 have downwardly inclined wedging surfaces 36. The space 37 between adjacent wedge blocks is provided for reception of the tie rod 41 to be discussed hereinafter. Planar surfaces 38 are provided on the wedging surfaces and these surfaces, when pulled into abutment, bear the lateral compression forces of the panel joint in a manner to become apparent hereinafter.

The connector assembly, indicated generally by the reference numeral 40, comprises an elongated tie rod or bar 41 having a lower wedging draw block 42 affixed thereto by any conventional means such as a screw 43. The lower wedging draw block 42 has upwardly directed, generally V-shaped wedging surfaces 44 which are adapted to receive the four lower wedging surfaces 36 of the lower wedge blocks 34 and 35. Affixed to the upper extremity of tie bar 41 by means of an elongated screw member 46 is the upper wedging draw block 45. Conveniently, tie rod 41 may be fabricated from a piece of metallic tubing tapped at one extremity as indicated at 47 and the elongated screw member 46 screwed directly therein. The screw member or bolt 46 passes through aperture 48 in the upper draw block 45 and the bolt head 49 shoulders within a suitable recess therein as will be apparent from FIGS. 1 and 2. A compression spring 50 is provided to prevent the upper wedging block 45 from sliding down on bolt 46 to assist in assembly and disassembly of the panel joint as will become apparent. The upper draw block 45 is provided with generally V-shaped wedging surfaces 53 which are adapted to receive the upper wedging surfaces 33 of the four upper wedge blocks 31 and 32 affixed to the panels 10a and 10b. When it is desired to interlock panels 10a and 10b they are slid into abutment as indicated in FIGS. 3 and 4 with the connector assembly 40 positioned between them such that the upper draw block 45 is above wedging blocks 31 and 32 and draw block 42 is below lower wedging blocks 34 and 35. The screw 46 is then rotated in such a direction as to cause draw blocks 42 and 45 to converge to the position indicated in FIG. 5. As the draw blocks converge under the influence of the effectively shortening tie bar 41, the upper wedging surfaces 33 slidably mate with wedging surfaces 53 on upper draw block 45 and the lower wedging surfaces 36 slidably mate with the wedging surfaces 44 on draw block 42. This causes the wedge blocks 31, 32, 34 and 35 on the adjacent panels to be drawn into rigid abutment at surfaces 38. The resulting connection is structurally rigid. Any tendency which might exist for the connector assembly 40 to slide up or down as viewed in FIG. 2 is obviated by the confinement of tie rod 41 within spaces 37 between the mating sets of upper and lower wedge blocks affixed to the panel walls and, additionally, by the structure of the hanger assembly to be described hereinafter.

The interlocked panel configuration provides a slot 78 on either side formed by the converging flanges 14. Slot 78 provides a means of access to the hanger assemblies 20 as will become apparent hereinafter.

The ease with which the panels can be interlocked can be facilitated by the provision of a positioning clip 51 affixed to the tie rod 41 as illustrated in FIG. 1. Clip 51 is received by mating panel positioning clips 52a or 52b which are affixed to 10a and 10b within channular recesses 12a and 12b at the approximate positions indicated in FIG. 1. After panel 10a has been vertically positioned, the connector assembly 40 is hung onto it as indicated in phantom in FIG. 1 by means of clips 51 and 52. The compression spring 50 forces the upper draw block 45 to the maximum upper position allowed by the adjustment of screw 46 and, if this adjustment is proper, a single operator may then grasp panel 10b and slide it sideways into abutment with panel 10a. The screw 46 can then be tightened to rigidly interlock the panels in the manner indicated previously. The provision of the mating positioning clips 51 and 52, thus, merely facilitate interconnection of the panels, leaving both of the operator's hands free to position the second panel prior to tightening of the connector assembly 40.

Once a particular space dividing configuration has become outdated or otherwise unusable, the panels can be separated by merely loosening screw 46 such that the upper and lower draw blocks 45 and 42 diverge. As screw 46 is loosened, the positioning clip 51 will again interlock with the positioning clip 52 when draw block 42 has been lowered a sufficient amount to clear the lower wedging blocks affixed to the panel and, as the screw is progressively loosened, spring 50 will push the upper draw block 45 out of engagement with the upper wedging blocks allowing the panels to be easily separated by a single operator.

Preferably, a panel positioning clip is provided on each of the panels to eliminate the necessity of arranging the panels such that one such clip would be provided at every joint. Thus, panel 10a is provided with positioning clip 52a and panel 10b with positioning clip 52b. Since the panels are usually completely reversible as regards their exterior finishes, the provision of such clips renders them universal from all standpoints, markedly adding to the convenience and utility of the entire system.

Referring now particularly to FIGS. 2, 4, and 7 through 13, the details of the novel accessory hanger bracket and clip assembly will be described. The hanger bracket assembly, indicated generally by the reference numeral 20, is positioned within channular recess 12 on each edge of each of the panels or other components forming a part of the system. The hanger bracket assembly 20 can be affixed to the panel by any conventional means such as screws. The assembly has a forward inclined surface or hanger strip 21 and a rear inclined surface 22. These surfaces initiate longitudinally adjacent the interior bases of flanges 14 and converge toward one another away from the panel edge as shown best in FIG. 2. The hanger bracket assembly 20 is completed by two forward connecting members 24, two rearwardly extending members 25 and a connecting web 29. The hanger bracket assembly 20, preferably, may be integrally fabricated from steel or the like by conventional rolling methods.

Each of the surfaces or hanger strips 21 and 22 are provided with a plurality of aligned slots. Thus, forwardly inclined surface 21 has slots 26 punched therein and rear inclined surface 22 has slots 27 punched therein. The slots communicate with a void area 28 between the surfaces and the base 13 of channular recess 12 resulting from the transverse disposition of the surfaces with respect thereto. The resulting configuration provides two generally box-like beams extending vertically within each of the channular recesses 12, each of the beams having a slopped exterior surface as viewed from the front of the panel. The slots 26 and 27 are positioned with respect to members 22 and 23 such that overlapping flanges 14 render them invisible when viewed from the front of the panel, thus adding to the aesthetic properties of the over-all system. Each hanger strip or surface 21 is aligned with respect to the other that clip slots 26 in each hanger strip or surface 21 are in substantial horizontal alignment so that accessory supporting clips 60 can be inserted into adjacent juxtaposed slots in the juxtaposed hanger strips at a common level for independent support of accessories at a common level.

The retainer clip 60, adapted for utilization in conjunction with the hanger frame assembly 20, has an accessory restraining section 61 having an accessory hook or niche 62 formed therein. The accessory restraining section 61 is integrally connected by means of a curved shank section 63 to a pair of hanger frame engaging hooks 64. The hooks 64 have a detent 65 depending from their rearmost extremities. The hanger frame engaging hooks 64 have a vertical dimension 68 which is slightly less than the vertical dimension of the slots 26 and 27. The hook is inserted at any desired height, as shown in FIGS. 8 and 9, by rotating it as indicated generally by the arrows 67 about vertical axes around the edge of flange 14 until the hook sections 64 protrude through the slots 26 or 27 into the void area 28 between the inclined surface and the base 13 of channular recess 12. Once this rotation has been completed, the clip 60 is moved downwardly as indicated by the arrow 69 in FIG. 9 until detents 65 lock the clip into the position illustrated in FIG. 12. Preferably, tolerances are kept such that the hanger bracket is engaged between facing compressing surface 66 on detents 65 and shank section 63 with sufficient firmness to prevent undesirable rotation of the clip during the hanging of the desired accessory.

As will be readily apparent from an examination of FIG. 2, each edge of each particular panel is capable of functioning independently of its abutting panel to support any particular accessory by means of the retainer clip 60. Thus, it is necessary to provide both right and left-handed clips for insertion into the various hanger bracket assemblies. The provision of such clips, however, allows a given accessory to be supported completely on one panel, independent (except, of course, for vertical stability) of the presence of the other panels within the system. Thus, as viewed in FIG. 11, bookshelves or the like 70 are shown supported on a panel 71 which is rigidly interlocked between panels 72 and 73. Should it be desirable to reposition the various wall panels for a new use, the various connector assemblies 40 can be removed and panel 71 moved to a new position without removing the shelves 70 therefrom and, when the panel is re-locked into its new position, utilization of the shelves can be resumed. Additionally, if desired, a chest 75 can be supported at the juncture between panels 71 and 72 by means of a retaining clip inserted into the hanger bracket assembly 20 associated with the right edge of panel 72 and extended from the point to a second support on the left-hand edge of panel 72. Preferably, the accessories are designed such that their edges do not overhang the center line of slots 78 (between facing flanges 14 of interlocked panels). This permits independently supported accessories to run in either direction from a given panel joint at identical or overlapping heights above the floor. Similarly, the configuration of curved shank section 63 of clip 60 should be such that they do not overhang the centerline of slots 78 (see FIG. 6) to permit their insertion into facing hanger slots on two adjacent panels at the same vertical height.

Referring now to FIGS. 14 through 17, a longitudinal channel support member generally designated as 102 has slidably positioned therein a hanger strip generally designated as 104. The hanger strip 104 supports clips generally designated as 106 in a plurality of vertically disposed slots 108. A pair of clip boards 110 are supported by the clips 106 through screw members 112 which are positioned in accessory supporting slots 114 of clip 106.

The support structure can be attached to a wall 116 through a screw 118 which passes through hanger strip 104 and channel 102, thereby restraining the longitudinal movement of hanger 104 with respect to channel 102.

The channel 102 more specifically comprises a pair of parallel side walls 120 and 122 connected at a back side thereof by a web having diagonally directed portions 124 and a central portion 126. The side walls 120 and 122 form an area 128 for receiving hanger engaging portions 136 of clip 106. Side wall 120 and web portion 124 form an acute angle for restraining lateral movement of clips 106 when it is positioned in a hanger slot 108. At the front edge, the channel contains inwardly directed flanges 129 which form restraining surfaces for the hanger 104 as well as provide a certain degree of shielding of the hanger slots 108. As can be seen from FIG. 14, without screw member 118, the hanger 104 will be longitudinally slidable within channel 102 but otherwise restrained in movement relative to channel 102.

Figure 15:
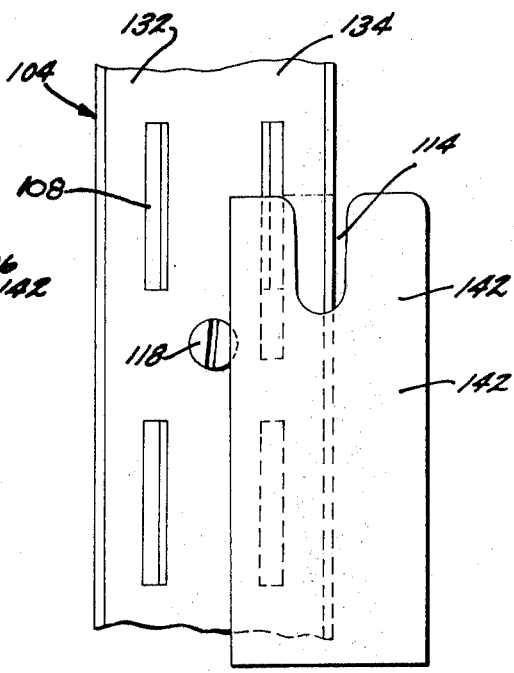
FIG. 15 is a front elevational view of a hanger strip and a clip shown in FIG. 14.

The hanger member comprises a central portion 130 which is positioned against the back web portion 126 of channel 102. Outwardly directed flanges 132 and 134 project from the central portion 130 and into the corners of the channel member 102 formed by the side walls 120 and 122 and the inwardly directed flanges 129. Each hanger member comprises a plurality of vertically aligned, clip engaging slots 108 (FIGS. 15 and 16).

Figure 16:
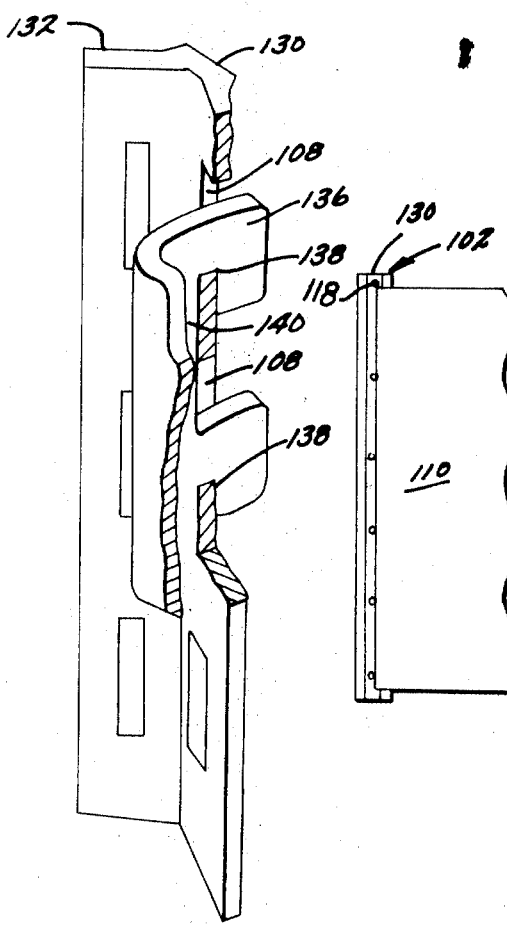
FIG. 16 is a perspective view, partly in section, showing the engagement of the clip and the hanger members of FIGS. 14 through 16.
Figure 17:
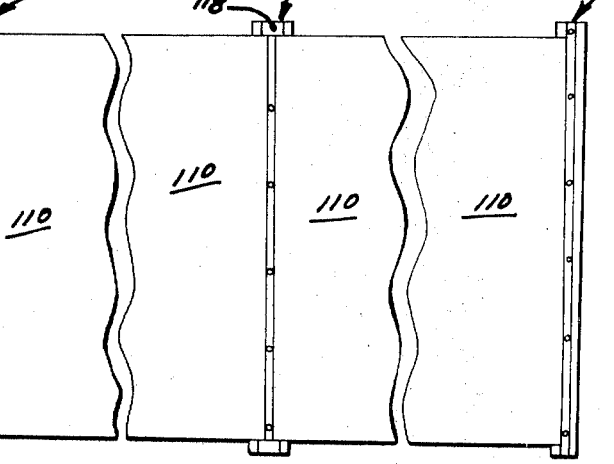
FIG. 17 is a front elevational view of a support system of FIG. 14 through 17 wherein a pair of clip boards are supported.

The clips 106 contain an inner portion 136 having slot engaging portions 138 which are separated by an inner wall 140 As can best be seen from FIG. 16, the slot engaging portions 138 support the clip vertically and prevent the clip from rotating about a horizontal axis. The clip 106 contains an outer portion 142 (FIG. 2) which is bent at an acute angle to the inner portion 136 to provide a surface which is parallel to the wall 116. The outer portion 142 contains accessory engaging slots 114.

Since the channel members 102 and the hanger strip 104 are substantially uniform in a vertical direction, they can be easily formed from aluminum extrusions with the slots 108 being cut or stamped out afterwards.

Whereas the embodiment of FIGS. 14 through 17 has been described with reference to clip boards which are supported by the inventive structure, it is obvious that within the scope of the invention, other units such as shelves, cabinets, and the like could be supported by the inventive structure.

The invention can also be employed in a free standing unit wherein one or more structural supports have at the bottom portion an outwardly extending flange which counterbalances the moment of the hanging accessories.

Referring now to FIGS. 18 and 19, a longitudinal channel support member generally designated as 202 has slidably positioned therein a hanger strip generally designated as 204. The longitudinal channel support member has a pair of parallel side walls 220 and 222 joined by a back wall section 224. A vertical wedge shaped channel 225 is cut in the inside edge of the back wall 224. The hanger member contains a pair of angularly disposed hanger strips 230 and 234 which are similar in construction to those shown in FIGS. 14, 15, and 16. The longitudinal channel support member 202 can be free standing or can be attached to a wall through a screw member 218 which extends from channel 225 through the back of back wall 224.

Clips generally designated as 206 are positioned within the clip hanger slots of hanger members 230 and 234. The clips have a hanger engaging portion with a downwardly extending hook of a configuration similar to that shown in FIG. 16. The outer portion of the hook 206 contains an upwardly facing groove 214 and a portion 242 which is bent back around and contacts inwardly facing flanges 229 of channel support member 202. Thus, the clip 206 will be rigidly constrained by backwardly directed portion 242.

Shelf members 210 are supported through brackets 212 by the clips 206. The brackets have a bar 213 which engages a groove in the shelf members 210. The brackets 212 has a hook 238 which engages groove 214 of clip 206. Disposed beneath hook 238 is a bearing member 211 on bracket 212 which abuts against inwardly directed flange 229.

Referring now to FIG. 20, a cabinet 250 is shown supported by a longitudinal support member 202. The cabinet 250 has a bracket 212' attached to the top portion thereof. Bracket 212' is identical to bracket 212 except that it contains no lower bearing portion 211. A hook such as 238 engages upwardly facing slots 214. A second clip 206 is positioned beneath the top supporting clip to provide a bearing surface at 252 to hold cabinet 250 away from channel support 202. This same structure is employed in holding the other end of the cabinet to an adjacent channel support member.

Referring now specifically to FIGS. 21, 22, and 23, a shelf unit 310 contains an end bracket 312 having a pair of downwardly facing slots 314. A bracket 316 engages a hanger member 230 and supports shelf member 310 through pins 320. The pins 320 have a head which engages an enlarged inner portion of slot 314. The bracket 316 can be attached to the hanger member 230 through conventional means such as disclosed with relation to FIG. 18 and FIG. 19, or can have a bent portion such as 318 with a downwardly extending hook to engage the slots of hanger member 230. In the latter instance, the bent inner portion 318 would be shaped like the slot engaging portions 138 of the clips 106 in FIG. 16.

Referring now to FIGS. 24, 25, and 26, a pair of hanger members 20a and 20b are disposed between a pair of facing channel-like members 12a and 12b in a manner such as has been described with reference to the first embodiment of the invention. Each hanger member contains a plurality of vertically disposed slots 27 for engaging clips. In this embodiment of the invention, the clips 340 are somewhat T-shaped in plan view (FIG. 24) having an accessory engaging portion 342 and a bent hanger engaging portion 344. The hanger engaging portion 344 is bent at an angle to the accessory engaging portion 342 so that the downwardly extending hook 346 can engage the slots 27 in the hanger strips while maintaining the accessory engaging portion parallel to the wall panels attached to channel members 12a and 12b. An accessory positioning indentation 349 is positioned in the top portion of accessory engaging portion 342 of the clip 340. The accessory engaging portion 342 has an outwardly extending portion at 348 for providing a complimentary surface with the shelf bracket. An accessory supporting bracket 352 has downwardly extending hooks 354 which fit into groove 349 which is wide enough to accept two accessory supporting brackets 352. In this embodiment, shelves 350 are attached to supporting brackets 352. The bracket 352 has a portion cut away at 356 to compliment the shape of the accessory supporting portion 342 of bracket 340. The innermost part of the supporting bracket 352 is positioned between the inwardly extending flanges 14 of the channel-like members 12a and 12b.

A modified accessory supporting clip is shown in FIGS. 27 and 28. The hanger members 20a and 20b, as well as the supporting channel members 12a and 12b, are the same as that shown in FIGS. 24 and 25, and in FIGS. 1 through 9.

The clip shown in FIG. 28 comprises a left side member 380 having an outwardly bent hanger engaging portion 382 with downwardly extending hooks 384 for engaging the slots 27 of hanger members 20a and 20b. The left side member 380 is bent outwardly at 386. Attached to side 388 is an accessory supporting bar 390 which can be spot welded to side 388. Both side 388 and accessory supporting bar 390 have a lower outwardly extending portion at 391 to cooperate with accessory supporting brackets as 352 shown in FIG. 26.

A right side member 394 has a side member 402 an inward crook 400 and a clip hanger engaging portion 396 which is bent outwardly at an angle to plane of side 402. A pair of hooks 398 on clip hanger engaging portion 396 hold the right side member in slots 27 of hanger 20b.

An accessory supporting bar 404 is attached to the end portion of side 402 for providing a supporting surface for accessory brackets 352. A screw 408 is positioned in hole 406 of right side member 394 and threadably engages hole 392 of left side member 380. In this manner, the left side member 380 and the right side member 394 are attached together after each of the respective members have been positioned in the hanger slots of hanger members 20a and 20b. In this embodiment, as in the previous embodiments, the clip hanger slots 27 are positioned behind flanges 14 so that the hanger slots 27 are not visible when the joint is viewed directly from the front. Therefore, each of the clips must be rotated toward the center line of the joint as it is inserted into the hanger slots. Therefore, the right side member and left side member cannot normally be connected together until after each has been inserted into the respective hanger slots.

Reasonable variation and modification are possible within the scope of the foregoing disclosure and the drawing, without departing from the spirit of the invention.

The embodiments of the invention in which an exclusive property or privilege is claimed are defined as follows.

1. A structural support system comprising a longitudinal casing means having a pair of spaced longitudinal side members fixedly spaced from each other, a pair of inwardly directed flanges at a front edge of said side members extending a portion of the distance from one side member to the other, the inner portions of said inwardly directed flanges being spaced from each other to leave a longitudinal opening; a longitudinal clip hanger means positioned within said casing means, said clip hanger means comprising at least two juxtaposed longitudinal hanger strips, each of said hanger strips having longitudinally disposed clip slots, said hanger strips being so positioned within said casing means that at least some clip slots in one of said hanger strips are in substantial horizontal alignment with corresponding clip slots in an adjacent hanger strip so that accessory supporting clips can be inserted into adjacent slots in adjacent hanger strips at a common level such that accessories can be independently supported at a common level in abutting relationship by said structural support system.

2. A structural support system according to claim 1 wherein said hanger strips are disposed at acute angles relative to said longitudinal side members and to said inwardly directed flanges.

3. A structural support system according to claim 2 further comprising at least one pair of clips, each clip positioned adjacent the other in adjacent hanger strips, each of said clips having a laterally bent hanger strip engaging portion and an accessory engaging portion, said accessory engaging portion being bent laterally away from each other and extending in a direction perpendicular to said inwardly directed flanges, thereby defining a narrow slot between said clips; accessory supporting members at an outermost portion of said clips between and attached to said clips, said clips being removably attached together at said accessory supporting members, whereby accessories containing brackets with downwardly extending hooks can be supported by said clips.

4. A structural support system according to claim 2 wherein there are at least two hanger strips, each of said two hanger strips being directed toward different longitudinal side members; and there is provided at least two clips, each clip having hanger strip engaging means and engaging a different hanger strip adjacent the other clip, said clips forming an accessory receiving portion at an end opposite said hanger strip engaging means, whereby accessories can be rigidly supported by both of the clips acting jointly.

5. A structural support system according to claim 2 further comprising accessory supporting clips having a hanger strip engaging portion and an accessory engaging portion, said hanger strip engaging portion being disposed at an acute angle to said accessory engaging portion.

6. A structural support system according to claim 5 wherein said clips are T-shaped with said hanger strip engaging portion forming the bottom of the T, and said accessory engaging portion containing an upwardly open slot.

7. A structural support system according to claim 6 wherein said clips are so shaped as to be adapted to support bracket containing accessories, said accessory engaging portion having an outwardly extending bearing surface, said brackets having downwardly facing hooks for seating in said upwardly opening slot of said accessory engaging portion, said bracket containing a recessed bearing surface beneath said downwardly facing hooks, a portion of said hooks being positioned within said inwardly directed flanges so as to be restrained thereby.

8. A structural support system according to claim 1 wherein said slots in each hanger strip are positioned generally between one of said side members and a plane parallel to said one side member and abutting the edge of an adjacent flange so that said slots are not readily visible from the front of said supporting structure.

9. In a room having a plurality of vertically disposed space divider panels; means for locking together adjacent panels at the facing edges thereof, and means for supporting wall hung accessories at the panel joints so formed, the improvement in said last mentioned means comprising:
  a flange affixed to the edge of one of said panels, said flange extending into the space between adjacent, interlocking panels;
  an elongated hanger strip affixed to the edge of said one panel;
  a plurality of aligned hanger clips receiving slots in said hanger strip, said slots being positioned generally between the edge of said panel and a plane parallel to the edge of said panel and abutting the edge of said flange such that said slots are substantially not visible from the front of said panel; and
  a hanger clip having a curved shank portion, one extremity of said shank portion having slot engaging means associated therewith and the other extremity thereof having an accessory supporting member associated therewith, said clip adapted to be supported from said slots.

10. In a room having a plurality of vertically disposed space divider components, means for locking together adjacent of said components at the facing edges thereof, and means for supporting wall-hung accessories at the component joints so formed, the improvement in said last mentioned means comprising:
- a flange affixed to the adjacent edges of at least two of said adjacent components at one side thereof, said flanges protruding into the space between said adjacent components and terminating to provide a vertical elongated opening at said component joint;
- elongated hanger strips affixed to each of said adjacent edges;
- a plurality of vertically aligned hanger clip receiving slots in each of said hanger strips, each row of said slots being disposed generally behind its associated flange such that they are substantially invisible through said elongated opening when said component joint is viewed from the front thereof; and
- at least one hanger clip having a curved shank portion with a slot engaging means formed on one end thereof and an accessory supporting member on the other end thereof, said shank portion curving such that no part of said clip extends beyond a vertical plane through the center of said joint and parallel to said component edges when said clip is inserted into said hanger strip such that one such clip may be inserted in either of said hanger brackets at an identical vertical position without interference.

11. The structure as set forth in claim 10 wherein said slot engaging means comprises two hook portions having detents extending from the end of said shank portion, said hook portions being spaced equally to the spacing between said slots such that one said hook portion may be inserted into each of vertically adjacent slots and the clip then dropped downwardly to engage said detents behind the hanger strip.

12. The structure as set forth in claim 10 further having like flanges affixed to the adjacent edges of said adjacent components on the other side thereof, said like flanges also having slotted hanger strips disposed therebehind whereby accessories can be supported from either side of said component joint.

13. The structure as set forth in claim 10 wherein said locking means comprises:
- upper and lower pairs of vertically separated wedging members associated with the facing edges of said adjacent components, each of said pairs having one of its members affixed to one of said facing edges; and
- upper and lower wedge mating member movably disposed between said facing edges, each of said wedge mating members adapted to mate with one of said pairs of wedging members and force them toward each other when said wedge mating members are moved in opposite direction between said facing edges.

14. The structure as set forth in claim 13 wherein said moving means comprises:
- an elongated tie bar means connected between said upper and lower wedge mating members; and
- means for selectively increasing and decreasing the length of said bar means.

15. A structural support comprising a vertical channel member, a vertically disposed hanger member fixed within said channel member, said hanger member containing a plurality of longitudinally disposed pairs of juxtaposed slots, each slot of said pair being in substantial horizontal alignment with the other slot of said pair, said hanger member being so shaped so as to permit independent accessory supporting means to engage each slot of a pair of said juxtaposed slots to permit independent support of adjoining accessories from said structural support at a common level.

16. A structural support according to claim 15 wherein there is further provided clip members in at least some of said slots extending out of said channel, said clip members having accessory supporting portions thereon.

17. A wall in a room having attached thereto a plurality of structural supports of claim 16 and containing a plurality of board members having clip engaging screw members engaging said clips, said board members hanging between said structural members.

18. A structural support according to claim 16 wherein said channel member and said hanger support member are so shaped as to provide lateral restraining surfaces for said clips when the same are positioned in said slots.

19. A structural support according to claim 18 wherein said clip members have at least two downwardly facing notches adapted to fit into two hanger member slots.

20. A structural support according to claim 19 wherein said clips contain upwardly facing notches at an upper outer portion of one end of the said hanger engaging means.

21. A structural support according to claim 15 wherein said channel member comprises two parallel, vertically disposed side walls conected at one edge by a web and having inwardly directed flanges at the other edge of said side walls.

22. A structural support according to claim 21 wherein said hanger member is disposed at acute angles relative to said side walls to provide a space between said side walls and said hanger for an inner hanger-engaging portion of said clip.

23. A structural support according to claim 22 wherein said web connecting said side walls extends diagonally inwardly in a central portion thereof to form an inner channel having an acute angle between said side wall and said web, thereby forming a horizontal restraining surface for said hanger engaging portion of said clip.

24. A structural support according to claim 15 wherein therein is provided a means to attach said support to a permanent wall.

25. A structural support according to claim 24 wherein said attaching means extends through a central portion of said channel and through said hanger member to attach said hanger member to said channel.

26. A structural support according to claim 15 wherein said hanger member has a central portion and two longitudinal flanges, said central portion is positioned against a central back portion of said channel and each flange extends outwardly from said back portion diagonally toward the sides of said channel and at an acute angle thereto.

27. A structural support according to claim 26 wherein each flange has vertically extending slots.

28. A structural support according to claim 26 wherein said channel member comprises two parallel vertically disposed side walls connected at one edge by a web and having inwardly directed flanges at the other edge of said side walls, and said hanger member flanges are positioned in the corners formed by said side walls and said inwardly directed channel flanges.

29. A structural support according to claim 28 wherein said channel web connecting said side walls extends diagonally inwardly in a central portion thereof to form an inner channel having an acute angle between said side wall and said web, thereby forming a horizontal restraining surface for hanger engaging portions of said clip.

30. A structural support according to claim 29 wherein said clips contain an inner portion having slot engaging notches and an outer portion containing upwardly facing notches, and said inner and outer portion are shaped so as to form an acute angle therebetween such that said outer portion is parallel to said channel web.

31. In a room having a plurality of vertically disposed space divider components, means for locking together adjacent of said components at the facing edges thereof, and means for supporting wall-hung accessories at the joints so formed, the improvement in the joints which comprises:
a longitudinal casing means having a pair of spaced longitudinal side members fixedly spaced from each other, a pair of inwardly directed flanges at a front edge of said side members extending a portion of the distance from one side member to the other, the inner portions of said inwardly directed flanges being spaced from each other to leave a longitudinal opening; a longitudinal clip hanger means positioned within said casing means, said clip hanger means comprising at least two juxtaposed longitudinal hanger strips, each of said hanger strips having longitudinally disposed clip slots, said hanger strips being so positioned within said casing means that at least some clip slots in one of said hanger strips are in substantial horizontal alignment with corresponding clip slots in an adjacent hanger strip so that accessory supporting clips can be inserted into adjacent slots in adjacent hanger strips at a common level such that accessories can be independently supported at a common level in abutting relationship by said structural support system.

32. The structure as set forth in claim 31 wherein two of said hanger strips are provided on each of said facing edges whereby said wall-hung accessories can be independently supported from at least one side of a single component independently of the other of said components and the joints therebetween.

References Cited

UNITED STATES PATENTS

| Re. 21,871 | 8/1941 | Welch | 248—243 |
| 1,917,917 | 7/1933 | Bales | 211—134 |
| 2,744,714 | 5/1956 | Parke | 52—36 X |
| 3,081,718 | 3/1963 | Shoffner | 52—36 X |
| 3,193,885 | 7/1965 | Gartner et al. | 52—36 |
| 3,305,981 | 2/1967 | Biggs et al. | 52—36 |
| 3,394,507 | 7/1968 | Doke | 52—36 |

PRICE C. FAW, JR., Primary Examiner

U.S. Cl. X.R.

52—499, 584; 211—134; 287—189.36

PO-1050
(5/69)

UNITED STATES PATENT OFFICE
CERTIFICATE OF CORRECTION

Patent No. 3,517,467          Dated June 30, 1970

Inventor(s) Robert L. Propst and James O. Kelley

It is certified that error appears in the above-identified patent and that said Letters Patent are hereby corrected as shown below:

Column 1, lines 25 through 55;
        Delete;

Column 9, line 47;
        "drawing" should be --- drawings ---.

SIGNED AND
SEALED
OCT 20 1970

(SEAL)
Attest:

Edward M. Fletcher, Jr.          WILLIAM E. SCHUYLER, JR.
Attesting Officer                Commissioner of Patents